(12) United States Patent
Oyman

(10) Patent No.: US 9,215,262 B2
(45) Date of Patent: Dec. 15, 2015

(54) STREAMING WITH COORDINATION OF VIDEO ORIENTATION (CVO)

(71) Applicant: Ozgur Oyman, San Jose, CA (US)

(72) Inventor: Ozgur Oyman, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/125,599

(22) PCT Filed: Oct. 28, 2013

(86) PCT No.: PCT/US2013/067054
§ 371 (c)(1),
(2) Date: Dec. 12, 2013

(87) PCT Pub. No.: WO2014/066887
PCT Pub. Date: May 1, 2014

(65) Prior Publication Data
US 2015/0089074 A1  Mar. 26, 2015

Related U.S. Application Data

(60) Provisional application No. 61/719,241, filed on Oct. 26, 2012, provisional application No. 61/753,914, filed on Jan. 17, 2013, provisional application No. 61/841,230, filed on Jun. 28, 2013.

(51) Int. Cl.
*H04L 29/06* (2006.01)
*H04N 21/845* (2011.01)
(Continued)

(52) U.S. Cl.
CPC .............. *H04L 65/608* (2013.01); *H04L 67/02* (2013.01); *H04N 21/2343* (2013.01); *H04N 21/23439* (2013.01); *H04N 21/25808* (2013.01); *H04N 21/41407* (2013.01); *H04N 21/422* (2013.01); *H04N 21/64322* (2013.01); *H04N 21/6582* (2013.01); *H04N 21/8456* (2013.01); *H04N 21/85406* (2013.01)

(58) Field of Classification Search
CPC .................. H04N 21/234363; H04N 21/4312; H04N 21/4402; H04N 21/6131; H04N 21/85406; G06F 15/177; H04L 1/0026; H04L 65/60; H04L 65/607; H04W 28/24
See application file for complete search history.

(56) References Cited

U.S. PATENT DOCUMENTS 7,065,641 B2   6/2006  Schelling
8,595,186 B1 *  11/2013  Mandyam et al. ............. 707/632
(Continued)

FOREIGN PATENT DOCUMENTS

KR   10-0631601 B1   10/2006
WO   2014/066887 A1   5/2014

OTHER PUBLICATIONS

Intel, Change Request: CR0049rev1, Jan. 22, 2013, 3GPP.*
(Continued)

*Primary Examiner* — Brian J Gillis
*Assistant Examiner* — Matthew Ballard
(74) *Attorney, Agent, or Firm* — Thorpe North & Western LLP

(57) ABSTRACT

Technology to provide streaming with coordination of video orientation (CVO) is disclosed. In an example, a server can include computer circuitry configured to: receive a device capability for a client; and modify streamed content to the client based on an inclusion of a CVO attribute in the device capability.

24 Claims, 11 Drawing Sheets

(51) Int. Cl.

| | | |
|---|---|---|
| *H04N 21/2343* | (2011.01) | |
| *H04N 21/258* | (2011.01) | |
| *H04N 21/414* | (2011.01) | |
| *H04N 21/422* | (2011.01) | |
| *H04N 21/643* | (2011.01) | |
| *H04N 21/658* | (2011.01) | |
| *H04N 21/854* | (2011.01) | |
| *H04L 29/08* | (2006.01) | |

(56) References Cited

U.S. PATENT DOCUMENTS

| | | | |
|---|---|---|---|
| 2008/0270528 | A1 | 10/2008 | Girardeau et al. |
| 2010/0106770 | A1* | 4/2010 | Taylor et al. ............... 709/203 |
| 2011/0276712 | A1 | 11/2011 | Narula et al. |
| 2011/0298982 | A1* | 12/2011 | Kobayashi ................. 348/581 |
| 2012/0020413 | A1* | 1/2012 | Chen et al. ............. 375/240.26 |
| 2012/0050451 | A1* | 3/2012 | Yan .......................... 348/14.02 |
| 2012/0086819 | A1* | 4/2012 | Wilson et al. ............. 348/207.1 |
| 2012/0106643 | A1* | 5/2012 | Fujimoto ............... 375/240.16 |
| 2012/0155398 | A1* | 6/2012 | Oyman et al. ............... 370/329 |
| 2012/0188882 | A1* | 7/2012 | Wilkinson et al. .......... 370/252 |
| 2012/0195196 | A1* | 8/2012 | Ghai et al. .................. 370/235 |
| 2012/0233345 | A1* | 9/2012 | Hannuksela ................ 709/231 |
| 2013/0342762 | A1* | 12/2013 | Wang et al. ................. 348/583 |
| 2014/0019635 | A1* | 1/2014 | Reznik et al. .............. 709/231 |
| 2014/0040959 | A1 | 2/2014 | Oyman |

OTHER PUBLICATIONS

Intel, Change Request: CR0204rev5, Jan. 22, 2013, 3GPP.*
Ericsson, Change Request: CR0237rev2, Nov. 8, 2012, 3GPP.*
Gellens, "The 'Codecs' and 'Profiles' Parameters for "Bucket" Media Types," RFC 6381, Aug. 2011, IETF.*
International Search Report and Written Opinion received for PCT Patent Application No. PCT/US2013/067054, mailed on Jan. 28, 2014, 10 pages.
3GPP, "Transparent end-to-end Packet-switched Streaming Service (PSS); Progressive Download and Dynamic Adaptive Streaming over HTTP (3GP-DASH)", 3rd Generation Partnership Project, Technical Specification Group Services and System Aspects, 3GPP TS 26.247 V11.0.0, Release 11, Sep. 2012, pp. 1-112.
3GPP, "IP Multimedia Subsystem (IMS) based Packet Switch Streaming (PSS) and Multimedia Broadcast/Multicast Service (MBMS) User Service; Protocols", 3rd Generation Partnership Project, Technical Specification Group Services and System Aspects, 3GPP TS 26.237 V11.0.0, Release 11, Jun. 2012, pp. 1-142.
3GPP, "IP Multimedia Subsystem (IMS); Multimedia Telephony; Media Handling and Interaction", 3rd Generation Partnership Project, Technical Specification Group Services and System Aspects, 3GPP TS 26.114 V11.5.1, Release 11, Oct. 2012, pp. 1-269.
3GPP, "Transparent end-to-end packet switched streaming service (PSS); 3GPP file format (3GP)", 3rd Generation Partnership Project, Technical Specification Group Services and System Aspects, 3GPP TS 26.244 V11.1.0, Release 11, Sep. 2012, pp. 1-60.
3GPP, "Transparent end-to-end Packet-switched Streaming Service (PSS); Protocols and codecs", 3rd Generation Partnership Project, Technical Specification Group Services and System Aspects, 3GPP TS 26.234 V11.1.0, Release 11, Sep. 2012, pp. 1-172.
Klyne et al., "Composite Capability/Preference Profiles (CC/PP): Structure and Vocabularies 1.0", W3C Recommendation, Jan. 15, 2004, 36 pages.
Open Mobile Alliance, "User Agent Profile", Approved Version 2.0, Feb. 6, 2006, pp. 1-46.
Brickley et al., "RDF Vocabulary Description Language 1.0: RDF Schema", W3C Recommendation, Jan. 23, 2003, 12 pages.
ISO/IEC 14496-12, "Information Technology—Coding of audio-visual objects—Part 12: ISO base media file format", Second edition, Apr. 1, 2005, 94 pages.

* cited by examiner

```xml
<!-- RepresentationBase type; extended by other Representation-related types -->
<xs:complexType name="RepresentationBaseType" abstract="true">
    <xs:sequence minOccurs="0" maxOccurs="unbounded">
        <xs:element name="FramePacking" type="DescriptorType" minOccurs="0" maxOccurs="unbounded"/>
        <xs:element name="AudioChannelConfiguration" type="DescriptorType" minOccurs="0" maxOccurs="unbounded"/>
        <xs:element name="ContentProtection" type="DescriptorType" minOccurs="0" maxOccurs="unbounded"/>
        <xs:element name="EssentialProperty" type="DescriptorType" minOccurs="0" maxOccurs="unbounded"/>
        <xs:element name="SupplementalProperty" type="DescriptorType" minOccurs="0" maxOccurs="unbounded"/>
        <xs:any namespace="##other" processContents="lax" minOccurs="0" maxOccurs="unbounded"/>
    </xs:sequence>
    <xs:attribute name="profiles" type="xs:string"/>
    <xs:attribute name="width" type="xs:unsignedInt"/>
    <xs:attribute name="height" type="xs:unsignedInt"/>
    <xs:attribute name="frameRate" type="FrameRateType"/>
    <xs:attribute name="audioSamplingRate" type="xs:string"/>
    <xs:attribute name="cvo_granularity" type="xs:unsignedInt"/>
    <xs:attribute name="mimeType" type="xs:string"/>
    <xs:attribute name="codecs" type="xs:string"/>
    <xs:attribute name="maximumSAPPeriod" type="xs:double"/>
    <xs:attribute name="startWithSAP" type="SAPType"/>
    <xs:attribute name="maxPlayoutRate" type="xs:double"/>
    <xs:attribute name="codingDependency" type="xs:boolean"/>
    <xs:anyAttribute namespace="##other" processContents="lax"/>
</xs:complexType>

<!-- Stream Access Point type enumeration -->
<xs:simpleType name="SAPType">
 <xs:restriction base="xs:unsignedInt">
  <xs:minInclusive value="0"/>
  <xs:maxInclusive value="6"/>
 </xs:restriction>
</xs:simpleType>

<!-- Type for Frame Rate -->
<xs:simpleType name="FrameRateType">
 <xs:restriction base="xs:string">
  <xs:pattern value="[0-9]*[0-9](/[0-9]*[0-9])?"/>
 </xs:restriction>
</xs:simpleType>
```

FIG. 7
(Table 3)

US 9,215,262 B2

STREAMING WITH COORDINATION OF VIDEO ORIENTATION (CVO)

RELATED APPLICATIONS

This application claims the benefit of and hereby incorporates by reference U.S. Provisional Patent Application Ser. No. 61/719,241, filed Oct. 26, 2012. This application claims the benefit of and hereby incorporates by reference U.S. Provisional Patent Application Ser. No. 61/753,914, filed Jan. 17, 2013. This application claims the benefit of and hereby incorporates by reference U.S. Provisional Patent Application Ser. No. 61/841,230, filed Jun. 28, 2013.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

The wireless device can be used receive multimedia delivery of Internet video using various protocols, such as hypertext transfer protocol (HTTP) streaming. A protocol to provide HTTP-based delivery of video streaming can include dynamic adaptive streaming over HTTP (DASH).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 7 (i.e., Table 3) illustrates a table of extensible markup language-syntax (XML-syntax) of common group and representation and attributes and elements in accordance with an example;

Figure 1:
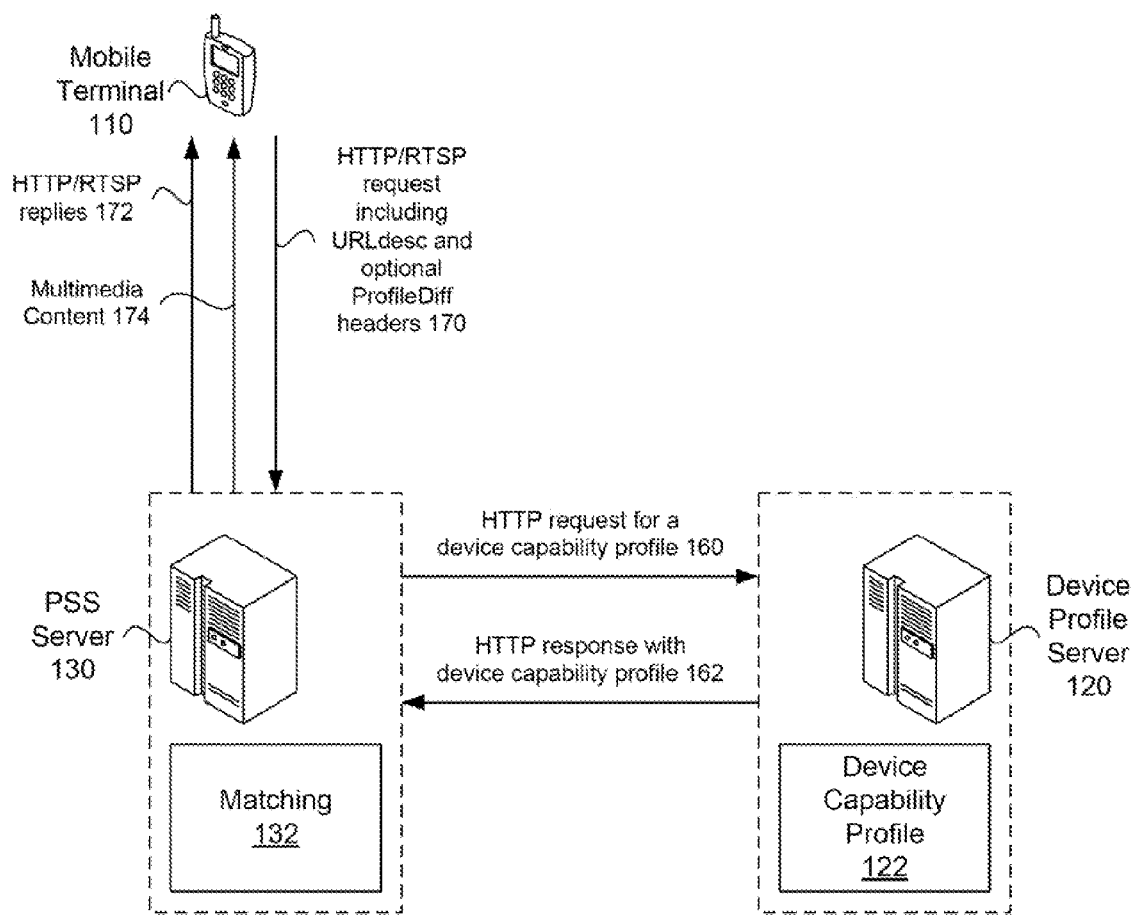
FIG. 1 illustrates a diagram of functional components in a packet switched streaming service (PSS) capability exchange in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The growth of multimedia services, including streaming and conversational services, is one of the drivers of the evolution to new mobile broadband technologies and standards. With a high consumer demand for multimedia services coupled with developments in media compression and wireless network infrastructures, enhancing the multimedia service capabilities of cellular and mobile broadband systems is desirable, where the multimedia service capabilities can be used to deliver a high quality of experience (QoE) to the consumers ensuring ubiquitous access to video content and services from any location, at any time, with any device and technology. Supporting various mobile devices and providing media handling procedures and session management protocols optimized for various device classes and capabilities can be used to enable delivery of multimedia content with high QoE in a ubiquitous fashion.

With the introduction of orientation sensors in mobile devices used in real-time video communication, the display content can be rotated to be aligned with the device orientation. In example, the orientation sensor can detect the device orientation by measuring the gravity field. Other types of orientation sensors may also be used. The device orientation can then be used in applications to adjust device functions according to orientation. For instance, the device can rotate the user interface or video orientation to either a portrait or landscape mode based on device orientation.

Because some client devices contain an orientation sensor, the content or service provider may provide different encoded versions of the content optimized for different device orientations or the content/service provider may capture or transcode the content during content capture (e.g., on-the-fly) in order to deliver an optimized experience. Signaling from the user equipment (UE) to the network of the orientation sensor capabilities and/or the current device orientation can provide opportunities to adapt the content on the network side to deliver a high quality client experience. Multimedia adaptation based device and/or video orientation adaptation can apply to both two-dimensional (2D) and three-dimensional (3D) video applications. For a 2D video example, portrait or landscape video views and/or different viewing angles may be adapted based on device orientation. For a 3D video example, the different viewing angles and depth information may be adapted based on device orientation.

Capability exchange signaling can be an important functionality in third generation partnership project's (3GPP's) packet switched streaming service (PSS) (as described in 3GPP technical specification (TS) 26.234 V11.1.0 (2012-09)), dynamic adaptive streaming over HTTP (DASH) (as described in 3GPP TS 26.247 V11.0.0 (2012-09)), and integrated multimedia subsystem (IMS) based PSS and multimedia broadcast and multicast service (MBMS) (abbreviated as IMS_PSS_MBMS, as described in 3GPP TS 26.237 V11.0.0 (2012-06)). Capability exchange enables PSS, DASH, and IMS_PSS_MBMS servers to provide a wide range of devices with content suitable for the particular device in question based on the knowledge of specific capabilities of the mobile terminal To facilitate server-side content negotiation for streaming, the PSS or IMS_PSS_MBMS server may have access to a description of the specific capabilities of the mobile terminal (MT) via a device capability description. The device capability description can contain a number of attributes. For DASH, the attributes of device capability signaling can include the following parameters: A pre-decoder buffer size, an initial buffering period, a decoder capability, display properties (e.g., screen size, resolution, or bit depth), a streaming method (e.g., real-time streaming protocol (RTSP) or HTTP) adaptation support, QoE support, extended real-time transport protocol (RTP) control protocol (RTCP) reporting support, and fast content switching support, as well as supported RTP profiles and session description protocol (SDP) attributes.

During the set-up of a streaming session, a server can use the device capability description to provide the mobile terminal with a correct type of multimedia content. The servers can use information about the capabilities of the mobile terminal to determine which stream to provision to the connecting terminal (e.g., mobile terminal). For instance, the server can compare the requirements on the mobile terminal for multiple available variants of a stream with the actual capabilities of the connecting terminal to determine a best-suited stream for that particular mobile terminal. Capability exchange also allows for delivery an optimized session description protocol (SDP) file to a client terminal (e.g., mobile terminal) for a PSS or IMS_PSS_MBMS session or an optimized media presentation description (MPD) metadata file to the client terminal for a DASH session.

FIG. 1 illustrates an example of capability exchange for PSS services. In an illustration, the mobile terminal 110 (or client device or client terminal) can informs the PSS server 130 about the MT's identity so that the PSS server can retrieve a device capability profile from a device profile server 120, which can store the device capability profile 122 for the mobile terminal. The MT can send a HTTP and/or RTSP request to the PSS server 170. The HTTP and/or RTSP request can include a uniform resource locator (URL) descriptor (URLdesc) and/or a profile difference (profileDiff) header. The PSS server can send a HTTP request to the device profile server for a device capability profile for the MT 160. The device profile server can send a HTTP response to the PSS server with device capability profile for the MT 162. The PSS server can match or copy the device capability profile 132. The PSS server can send HTTP and/or RTSP replies 172 and multimedia content 174 to the MT based on the device capability profile for the MT. In an example, a terminal manufacturer or a software vendor can maintain a device profile server to provide device capability profiles for the manufacturer or vendor's products. In another example, an operator can manage a device profile server for the operator's subscribers, which can allow the subscriber to make user specific updates to the subscribers' profiles. The device profile server can provide device capability profiles to the PSS server on request.

The technology (e.g., servers, client devices or terminals, mobile terminals, methods, computer circuitry, and systems) as described herein can provide coordination of video orientation (CVO) capability of the mobile terminal or client device. Different streaming paradigms (e.g., PSS, DASH, and IMS_PSS_MBMS), can use different multimedia adaptation methods and processes, which is explained in greater detail below.

Figure 2:
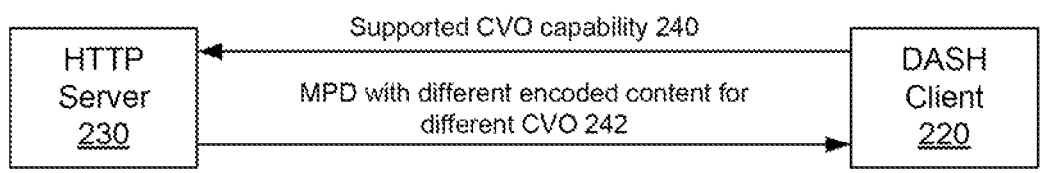
FIG. 2 illustrates an example dynamic adaptive streaming over hypertext transfer protocol (HTTP) based (DASH-based) streaming with coordination of video orientation (CVO) in accordance with an example.

A service can use a pull-based streaming process or a push-based streaming process. DASH provides an example of pull-based streaming. For a DASH session, a HTTP server 230 provides the content optimized for different CVO to a DASH client 220, as illustrated in FIG. 2. The HTTP server may use the device capability exchange signaling from the DASH client describing the various supported CVO states 240. The set of CVOs and corresponding content information can be signaled to the DASH client in the media presentation description (MPD) metadata file 242 with different encoded content for different CVOs, which server-client interaction is depicted in FIG. 2. The DASH client player can then track the current CVO and request the corresponding versions of the content optimized for the current CVO.

Figure 3:
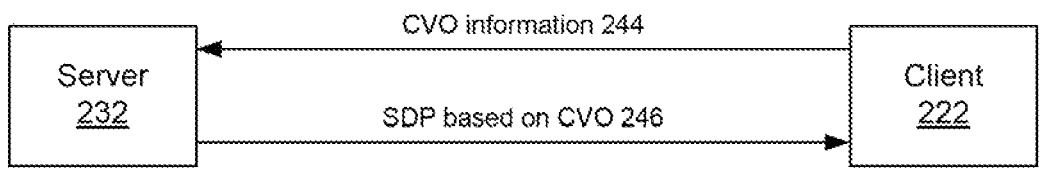
FIG. 3 illustrates an example real-time streaming protocol-based (RTSP-based) streaming with coordination of video orientation (CVO) in accordance with an example.

The PSS services based on the real-time streaming protocol (RTSP) and the IMS_PSS_MBMS service based on the session initiation protocol (SIP) provide examples of push-based streaming. For the PSS or IMS_PSS_MBMS service, the server 232 can receive the CVO information 244 from the client 222 and adapt the content based on the CVO, as illustrated in FIG. 3. For instance, the server can select a most suited content version among stored content versions or dynamically transcodes the content based on the CVO and stream the content to the client 246, which server-client interaction is depicted in FIG. 3. The session-related metadata carried in the session description protocol (SDP) may carry the CVO for the streamed content.

Additional attributes can be added in PSS vocabulary device capability exchange signaling. For instance, attributes "StreamingCVOCapable", "StreamingHighGranularityCVOCapable", "ThreeGPCVOCapable", and "ThreeGPHighGranularityCVOCapable" (or attributes with similar functionality) can be included or added in the Streaming and ThreeGPFileFormat component of the PSS base vocabulary in TS 26.234 describing the 3GPP PSS unicast streaming specification and TS 26.244 V11.1.0 (2012-09) describing the 3GPP file format specification. The attributes can have a name, definition, a component, a type, legal values (or valid options), and a resolution rule. A possible syntax for these additional attributes can be as follows:

Attribute name: StreamingCVOCapable

Attribute definition: Indicates whether the client is a CVO capable receiver of RTP streams, i.e. provided that the video orientation information for the delivered content is communicated to the client in an RTP extension header (corresponding to urn:3gpp:video-orientation), the client can interpret the video orientation and align the video correctly for rendering/display purposes. If this attribute is reported and the StreamingHighGranularityCVOCapable attribute is reported as a "Yes", then the value of this attribute can be a "Yes".

Component: Streaming
Type: Literal
Legal values: "Yes", "No"
Resolution rule: Locked
Attribute name: StreamingHighGranularityCVOCapable Attribute definition: Indicates whether the client is a Higher Granularity CVO capable receiver of RTP streams, i.e. provided that the video orientation information of the delivered content is communicated to the client in an RTP extension header (corresponding to urn:3GPP:video-orientation:6), the client can interpret the video orientation and align the video correctly for rendering/display purposes.

Component: Streaming
Type: Literal
Legal values: "Yes", "No"
Resolution rule: Locked
Attribute name: ThreeGPCVOCapable Attribute definition: Indicates whether the client is a CVO capable receiver of 3GP files, i.e. provided that the video orientation information (corresponding to urn:3gpp:video-orientation) of the delivered content is communicated to the client in a 3GP file, the client can interpret the video orientation and align the video correctly for rendering/display purposes. If this attribute is reported and the ThreeGPHighGranularityCVOCapable attribute is reported as a "Yes", then the value of this attribute can be a "Yes".

Component: ThreeGPFileFormat
Type: Literal
Legal values: "Yes", "No"
Resolution rule: Locked
Attribute name: ThreeGPHighGranularityCVOCapable Attribute definition: Indicates whether the client is a Higher Granularity CVO capable receiver of 3GP files, i.e. provided that the video orientation information (corresponding to urn:3gpp:video-orientation:6) of the delivered content is communicated to the client in a 3GP file, the client can interpret the video orientation and align the video correctly for rendering/display purposes.

Figure 4:
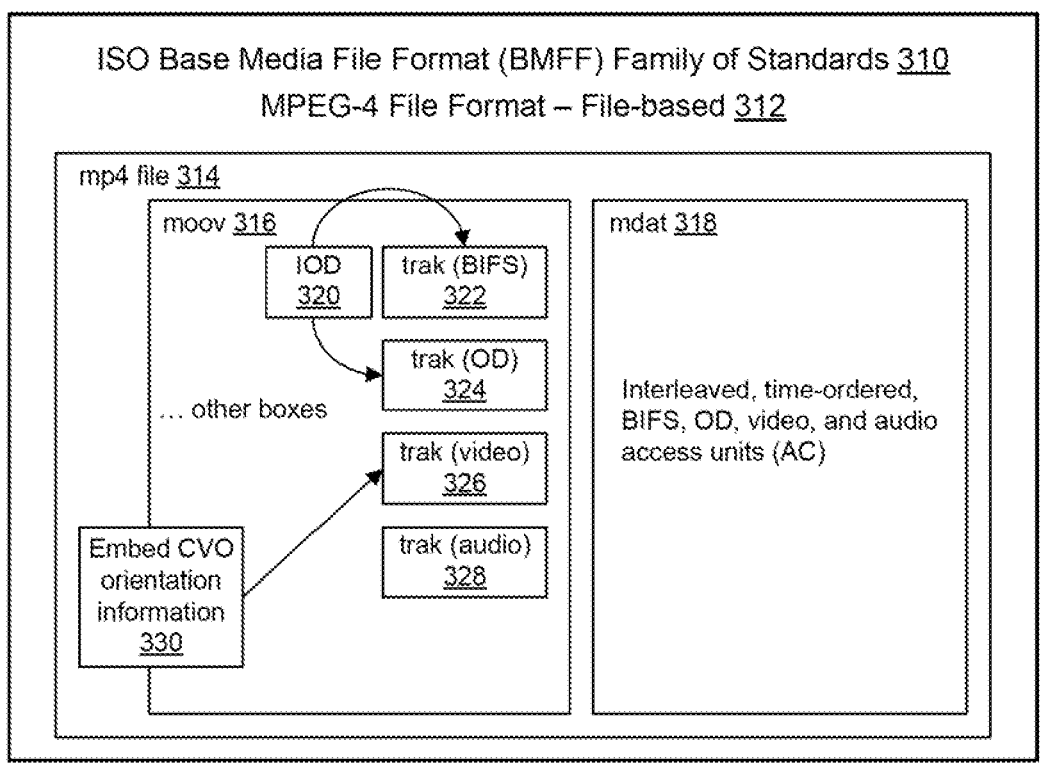
FIG. 4 illustrates an example of embedding coordination of video orientation (CVO) information in a third generation partnership project (3GPP) file format (3GP) file using an instantiation of the International Organization for Standardization-base (ISO-base) media file format (ISO-BMFF) in accordance with an example.

Component: ThreeGPFileFormat
Type: Literal
Legal values: "Yes", "No"
Resolution rule: Locked The technology described herein can also embed CVO information into the captured content, such as a 3GP file. Embedding CVO information in a 3GP file (as described in 3GPP technical specification (TS) 26.244 V11.1.0 (2012-09); e.g., mp4 file 314 in a moving picture experts group-4 (MPEG-4) file format 312) as an instantiation of an International Organization for Standardization (ISO) Base Media File Format (BMFF) 310 for later use by servers as part of streaming and download applications can be beneficial, as illustrated in FIG. 4. The inclusion of such CVO information in the 3GP file can better enable the server to perform orientation-aware multimedia adaptation for optimizing content delivery to devices (e.g., correcting the video to avoid misalignment problems prior to sending to an orientation-unaware device). The embedded CVO information can be provided in device orientation capability attributes in the PSS vocabulary and device capability signaling framework. The content file (e.g., mp4 file 314) can include an initialization segment, such as a "moov" box 316, and media data (mdat 318). The moov box can include initial object descriptor (IOD) 320, a BInary Format for Scene (BIFS) trak 322, an object descriptor (OD) trak, a video trak 326, and an audio trak 328. The embedded CVO information 330 can be included in the video trak (or track). The mdat can include interleaved, time-ordered, BIFS, OD, video, and audio access units (AC).

In another example, a service specification can support orientation-aware streaming. For example, for RTP streaming which can rely on the SDP, coordination of video orientation (CVO) can be added into the PSS specification. In the PSS RTP-streaming context, CVO can include signaling of a current orientation of an image to a CVO-capable PSS client for appropriate rendering and displaying. A CVO-capable PSS server can perform signaling of the CVO by indicating the CVO in the SDP and using RTP header extensions with a byte formatted for CVO (corresponding to urn:3gpp:video-orientation) and a byte formatted for Higher Granularity CVO (corresponding to urn:3gpp:video-orientation:6). The RTP header extensions can be defined by 3GPP technical specification (TS) 26.114 V11.5.0 (2012-09).

A CVO-capable PSS client can rotate the video to compensate the rotation for CVO and Higher Granularity CVO. When compensating for both rotation and flip, operations can be performed in the LSB to MSB order (i.e., rotation compensation first and then flip compensation).

A CVO-capable PSS server can add the payload bytes to a last RTP packet in each group of packets which make up a key frame (e.g., inter frame (I-frame) or instantaneous decoding refresh (IDR) in a H.264). The PSS server may also add the payload bytes onto the last RTP packet in each group of packets which make up another type of frame (e.g. a predicted frame (P-frame)) when the current value is different from a previous value sent.

An inter frame (I-frame) is a frame in a video compression stream which can be expressed in terms of one or more neighboring frames. An IDR access unit can contain an intra-picture (i.e., a coded picture that can be decoded without decoding any previous pictures in a Network Abstraction Layer (NAL) unit stream, and the presence of an IDR access unit can indicate that no subsequent picture in the stream will use reference to pictures prior to the intra picture the IDR access unit contains in order to be decoded). The H.264/moving picture experts group-4 (MPEG-4) (H.264/MPEG-4) part 10 or advanced video coding (AVC) is a video compression format, which can be used for the recording, compression, and distribution of high definition video. A P-frame can be a type of I-frame to define forward predicted pictures. The prediction can be made from an earlier picture, mainly an I-frame, for less data coding.

If a CVO RTP header extension is the only header extension present, a total of 8 bytes can appended to the RTP header, and the last packet in the sequence of RTP packets can be marked with both a marker bit and an extension bit.

If CVO information is signaled in the RTP header extension, the PSS server can signal the CVO information in the SDP by including an a=extmap attribute indicating an CVO uniform resource name (URN) under a relevant media line scope. The CVO URN can be represented as: urn:3gpp:video-orientation. An example usage of a URN to signal CVO relative to a media line is as follows: "a=extmap:7 urn:3gpp:video-orientation". The number 7 in the CVO URN example may be replaced with any number in a range 1-14.

If Higher Granularity CVO information is signaled in the RTP header extension, the PSS server can signal the Higher Granularity CVO information in the SDP in a similar fashion with the CVO URN, where a Higher Granularity CVO URN can be represented as: urn:3gpp:video-orientation:6. An example usage of a URN to signal CVO relative to a media line is as follows: "a=extmap:5urn:3gpp:video-orientation:6".

Figure 5:
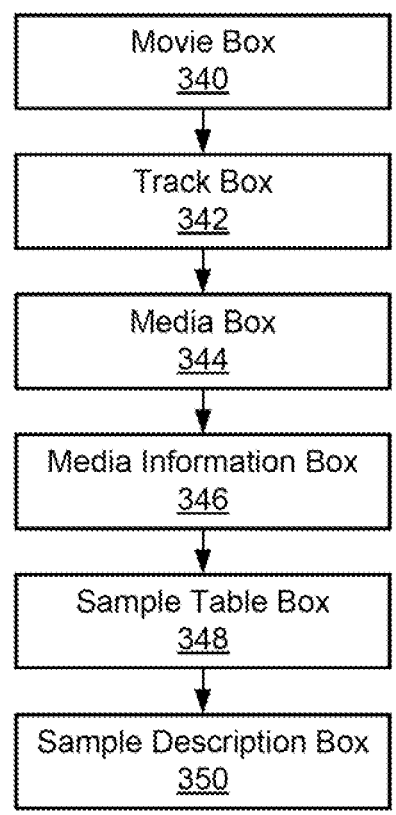
FIG. 5 illustrates an International Organization for Standardization (ISO) file format box structure hierarchy in accordance with an example.

Accordingly, in an example, the inclusion of CVO information can be logged within a 3GP file format as a continuous recording of a series of orientation values of the images captured. A box can be defined in the ISO base media file format (ISO-BMFF) or the 3GPP file format for timed CVO information. For instance, the video track or the RTP hint track of the 3GPP file format (3GP) may be used to embed the orientation information. For content formatted based on DASH, the CVO information may be carried within a file-level ISO-BMFF box, such as in initialization segment (e.g., in a "moov" box for ISO-BMFF) or in media segments (e.g., in a 'moof' box for ISO-BMFF), as illustrated in FIG. 4. In another example, the timed metadata track of the ISO-BMFF may be chosen as the track to contain the CVO information. For instance, a new box can be created specifically for CVO, such as a CVOSampleEntry with a description of the CVO parameters. Other boxes within the sample description box 350 in the ISO file format box structure hierarchy, as shown in FIG. 5, may also be used to contain the CVO information. The ISO file format box structure hierarchy can include a movie box 340, a track box 342, a media box 344, a media information box 346, a sample table box 348, and the sample description box, where higher order boxes are listed first. The sample description box can have one or more sample entries, such as MP4VisualSampleEntry, AVCSampleEntry, HintSampleEntry, or CVOSampleEntry.

In another example, the video orientation (e.g., CVO) information can be included in a 3GP file format, which can be included in TS 26.244. When CVO data is stored in the 3GP file format, a timed metadata track can be used with a CVOSampleEntry box. The CVOSampleEntry can indicate that the metadata sample format is a single byte of CVO data. Each metadata track containing CVO data can reference a video track 326 where the metadata track describes the video track using a 'cdsc' track reference as defined in the ISO base media file format (ISO-BMFF).

In an example, a box type of the CVOSampleEntry Box can have a codecs attribute set to be '3gvo'. The CVOSampleEntry Box can be defined as follows:

CVOSampleEntry::=BoxHeader
Reserved_6
Data-reference-index
Granularity

The fields for the CVOSampleEntry Box can be defined by Table 1. The CVOSampleEntry Box fields can include a field name, type, details, and a value.

TABLE 1

| Field | Type | Details | Value |
|---|---|---|---|
| BoxHeader.Size | Unsigned int(32) | | |
| BoxHeader.Type | Unsigned int(32) | | '3gvo' |
| Reserved_6 | Unsigned int(8) | | 0 |
| Data-reference-index | Unsigned int(16) | Index to a data reference that to use to retrieve the sample data. Data references are stored in data reference boxes. | |
| Granularity | Unsigned int(8) | Granularity used in CVO Rotation | Takes value 2 for CVO and 6 for high granularity CVO. |

The technology described provides streaming or download of content with oriented video components (e.g., CVO components). Device orientation-aware multimedia adaptations provide streaming or download of previously captured and uploaded content with oriented video components. For example, as part of a PSS download or MBMS download application, the server may push captured content with oriented video components to the client in a non-real time fashion for later playback. Or as part of a DASH-based streaming service, an HTTP server may deliver user-generated content (UGC) to DASH clients that may contain oriented video components. For a RTP-based streaming of UGC content may be delivered from PSS servers. In these contexts, the server may receive information on the video orientation capabilities supported by the client device and determine an optimal delivery mechanism (e.g., select the most suited content version among various stored content versions and/or dynamically transcode the content) based on the video orientation capabilities of the terminal and deliver the optimally chosen content to the client.

For example, if the server determines that the content was captured by an orientation-aware terminal (e.g., through the inspection of the 3GP-based content file), while the receiving client device is not orientation-aware (e.g., known based on PSS device capability signaling mechanisms), the server may process (e.g., apply transcoding to) the content to correct and avoid misalignment problems during later rendering and display. If the receiving client device is orientation-aware, then the server may not have to correct the misalignment, but instead can choose to send the content "as is" (i.e., without modification) along with video orientation information embedded in the content (e.g., in an RTP extension header for RTP streaming or inside a 3GP file for HTTP streaming and DASH) so that the receiving client device can correct the misalignment.

Figure 6:
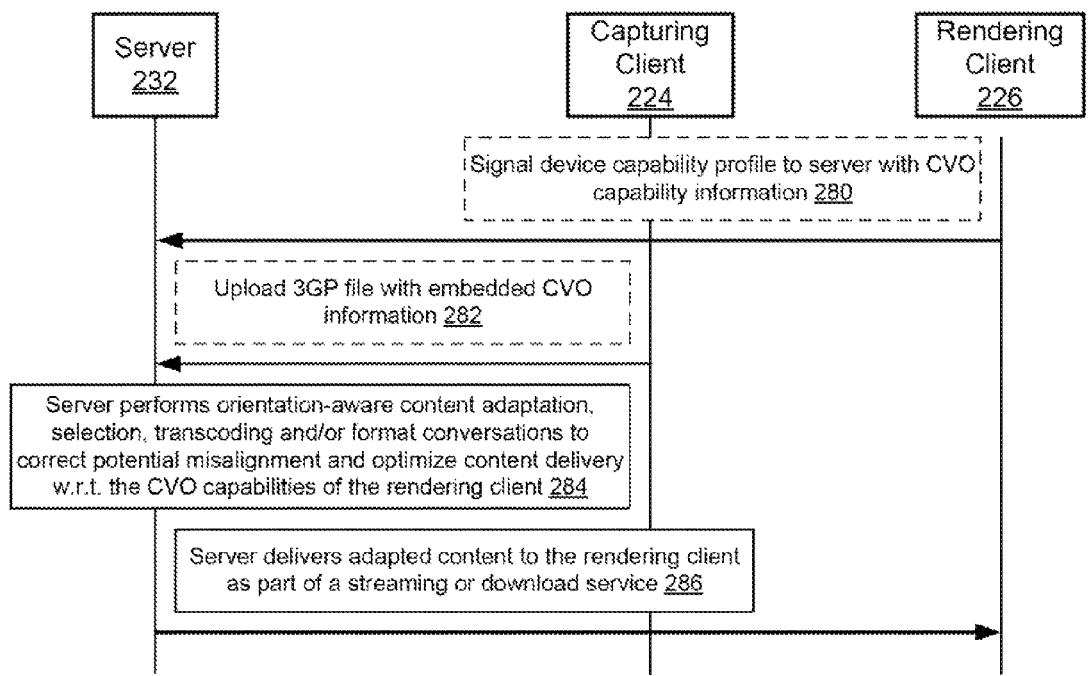
FIG. 6 illustrates an example server-client interaction using device orientation-aware multimedia adaptation based on reception of content with embedded coordination of video orientation (CVO) information in accordance with an example.

FIG. 6 illustrates an example server-client interaction realizing orientation-aware media delivery based on reception of content with embedded CVO information. For example, a capturing client 224 can capture CVO information with the capture and upload the content (e.g., 3GP file) with embedded video orientation information 282 to the server 232. In another example, a rendering client 226 can signal a device profile to the server with CVO capability information 280. Server performs orientation-aware content adaptation, selection, transcoding and/or format conversations to correct potential misalignment and optimize content delivery with respect to (w.r.t.) the CVO capabilities of the rendering client 284, as previously described. The server can then deliver adapted content to the rendering client as part of a streaming or download service 286.

In another example, consistent with a server-client interaction as illustrated in FIG. 6, a DASH server can learn from the client (e.g., rendering client 226) that the client has the ability to process CVO information and correct for misalignment. The server can then designate in a MPD on the presence of CVO information in the DASH representations (i.e., if the DASH segments are stored content, the DASH server may have to detect the presence of CVO information before the DASH server can determine, by parsing, the 3GP files corresponding to the DASH segments and can check if video orientation information is indicated in the metadata track). The DASH client upon reception of the MPD can then activate a video-orientation engine to process the signaled CVO information (i.e., parsing of the 3GP files corresponding to DASH representations) in the DASH segments and correct any misalignments and cand render/display video with correct alignment.

Also consistent with server-client interaction as illustrated in FIG. 6, a DASH server can learn from the client that the client does not have the ability to process CVO information and correct for misalignment. The server can detect the presence of CVO information in the content since the MPD can indicate the CVO information. In response, DASH server can process the 3GP files corresponding to the DASH representations offered in the MPD in order to correct for any misalignments and can send the requested content to the DASH client after this processing.

In another configuration, a CVO information indication can be implemented in a DASH MPD based on TS 26.247. For instance, a CVO indication attribute (e.g., cvo_granularity) can be included in the MPD, where the MPD can have common attributes and elements. The elements AdaptationSet, Representation and SubRepresentation can have assigned common attributes and elements, such as the CVO indication attribute. The semantics of the CVO indication attribute can be as shown in Table 2, which illustrates a table of common adaptation set, representation, and sub-representation attributes and elements. Each element or attribute can have an element or attribute name, use, or description. The 'use' column in Table 2 can interpret an attribute marked with 'M' (mandatory) as available for a representation. For instance, the attribute or element may either be present in the Representation element, or if not, the attribute or element may be in the AdaptationSet element. An attribute marked with 'O' (optional) may be absent in both the Representation element and the AdaptationSet element.

TABLE 2

| Element or Attribute Name | Use | Description |
| --- | --- | --- |
| Common attributes and elements | | |
| @cvo_granularity | O | if present, this indicates presence of CVO information in the media segments and the value of the attribute indicates the granularity in bits. The allowed values are 2 and 6, corresponding to URNs |

TABLE 2-continued

| Element or Attribute Name | Use | Description |
| --- | --- | --- |
| | | urn:3gpp:video-orientation and urn:3gpp:video-orientation:6, respectively. This attribute may not be present if media segments do not contain CVO information |

Legend:
For attributes: M = Mandatory, O = Optional.
For elements: <minOccurs>..<maxOccurs> (N = unbounded)
Elements are bold; attributes are non-bold and preceded with an @.

The extensible markup language-syntax (XML-syntax) for the CVO indication attribute (e.g., cvo_granularity) can be as shown in Table 3 illustrated in FIG. 7.

Figure 8:
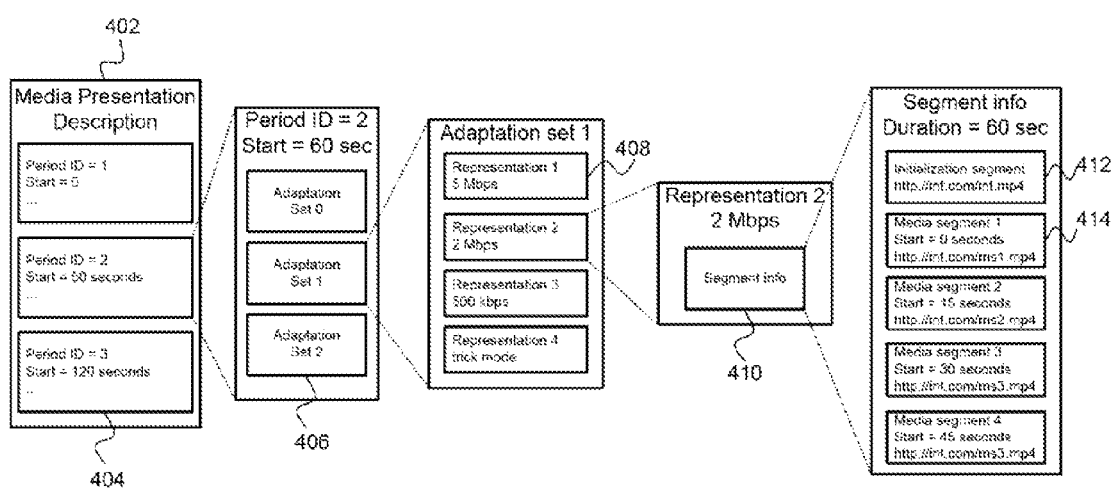
FIG. 8 illustrates a block diagram of a media presentation description (MPD) metadata file configuration in accordance with an example.

As previously discussed, DASH is a standardized HTTP streaming protocol. As illustrated in FIG. 8, DASH can specify different formats for a media presentation description (MPD) metadata file 402 that provides information on the structure and different versions of the media content representations stored in the server as well as the segment formats. The MPD metadata file contains information on the initialization and media segments for a media player (e.g., the media player can look at initialization segment to determine a container format and media timing information) to ensure mapping of segments into a media presentation timeline for switching and synchronous presentation with other representations. DASH technology has also been standardized by other organizations, such as the moving picture experts group (MPEG), open IP television (IPTV) forum (OIPF), and hybrid broadcast broadband TV (HbbTV).

A DASH client can receive multimedia content by downloading the segments through a series of HTTP request-response transactions. DASH can provide the ability to dynamically switch between different bit rate representations of the media content as the bandwidth that is available to a mobile device changes. Thus, DASH can allow for fast adaptation to changing network and wireless link conditions, user preferences and device capabilities, such as display resolution, the type of central processing unit (CPU) employed, the memory resources available, and so forth. The dynamic adaptation of DASH can provide a better quality of experience (QoE) for a user, with shorter startup delays and fewer rebuffering events than other streaming protocols.

In DASH, a media presentation description (MPD) metadata 402 can provide information on the structure and different versions of the media content representations stored in a web/media server. In the example illustrated in FIG. 8, the MPD metadata is temporally divided into periods 404 having a predetermined length, such as 60 seconds in this example. Each period can include a plurality of adaptation sets 406. Each adaptation set can provide information about one or more media components with a number of encoded alternatives. For example, adaptation set 0 in this example might include a variety of differently encoded audio alternatives, such as different bit rates, mono, stereo, surround sound, CVO, and so forth. In addition to offering different quality audio for a multimedia presentation over the period ID, the adaptation set may also include audio in different languages. The different alternatives offered in the adaptation set are referred to as representations 408.

In FIG. 8, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video may also be available in different formats, such as two dimensional (2D) or three dimensional (3D) video, or portrait or landscape oriented video (e.g., CVO). Each representation 408 can include segment information 410. The segment information can include initialization information 412 and the actual media segment data 414. In this example, an MPEG-4 (MP4) file is streamed from a server to a mobile device. While MP4 is used in this example, a wide variety of different codecs may be used, as previously discussed.

The multimedia in the adaptation set can be further divided into smaller segments. In the example of FIG. 8, the 60 second video segment of adaptation set 1 is further divided into four sub-segments 414 of 15 seconds each. These examples are not intended to be limiting. The actual length of the adaptation set and each media segment or sub-segment is dependent on the type of media, system requirements, potential types of interference, and so forth. The actual media segments or sub-segments may have a length that is less than one second to several minutes long.

Figure 9:
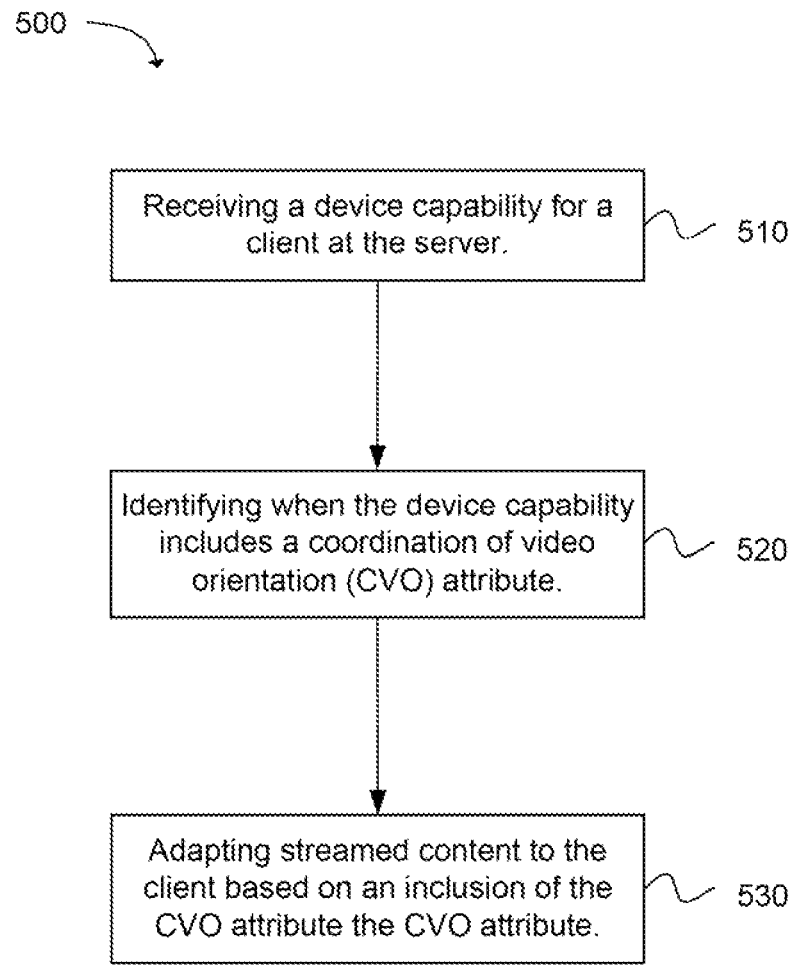
FIG. 9 depicts a flow chart of a method for signaling coordination of video orientation (CVO) capability of a mobile terminal (MT) at a server in accordance with an example.

Another example provides a method 500 for signaling coordination of video orientation (CVO) capability of a mobile terminal (MT) at a server, as shown in the flow chart in FIG. 9. The method may be executed as instructions on a machine or computer circuitry, where the instructions are included on at least one computer readable medium or one non-transitory machine readable storage medium. The method includes the operation of receiving a device capability for a client at the server, as in block 510. The next operation of the method can be identifying when the device capability includes a CVO attribute, as in block 520. The method can further include adapting streamed content to the client based on an inclusion of the CVO attribute the CVO attribute, as in block 530.

In an example, the operation of adapting the streamed content can further include: modifying a display orientation of the a hypertext transfer protocol (HTTP) stream, dynamic adaptive streaming over HTTP (DASH), or real-time transport protocol (RTP) stream for misalignment when the device capability for the client does not include the CVO attribute indicating that the client is not an orientation-aware terminal; or embedding a CVO indication attribute in a media presentation description (MPD) metadata file or a session description protocol (SDP) file when the device capability for the client includes the CVO attribute indicating that the client is an orientation-aware terminal to modify the display orientation of a stream.

In another example, the method can further include delivering a media presentation description (MPD) metadata file for a streamed dynamic adaptive streaming over hypertext transfer protocol (HTTP) (DASH) content to the client with a CVO indication attribute provided in a codecs common attribute or element for an AdaptationSet, Representation, or SubRepresentation. The codecs attribute can be set to '3gvo' indicating a presence of an oriented video component and associated CVO information in the stream DASH content. The method can further include deliver a session description protocol (SDP) file for a real-time transport protocol (RTP) stream to the client with a CVO indication via an a=extmap attribute with a CVO uniform resource name (URN) urn: 3gpp:video-orientation" representing a 2-bit granularity for a CVO or "urn:3gpp:video-orientation:6" representing a 6-bit granularity for a Higher Granularity CVO on the CVO information contained in a RTP extension header.

In another configuration, the operation of adapting the streamed content can further include receiving user-generated content (UGC) video including embedded CVO information for the UGC video in a third generation partnership project (3GPP) file format (3GP) file. The 3GP file can uses a CVOSampleEntry for a CVO timed metadata track in a sample description box of International Organization for Standardization (ISO) file format box structure. The CVOSampleEntry fields can include a BoxHeader size or type, a Data-reference-index, or a Granularity, where the BoxHeader type can be configured for a 3gvo value. Or, the 3GP file can use a codecs common attribute or element for an AdaptationSet, Representation, or SubRepresentation of a media presentation description (MPD). The codecs attribute can be set to '3gvo' indicating a presence of an oriented video component and associated CVO information in a streamed dynamic adaptive streaming over hypertext transfer protocol (HTTP) (DASH) content.

In another example, the operation of adapting the streamed content can further include storing CVO data in a third generation partnership project (3GPP) file format (3GP) file using a CVOSampleEntry for a CVO timed metadata track in a sample description box of International Organization for Standardization (ISO) file format box structure. The CVOSampleEntry fields can include a BoxHeader size or type, a Data-reference-index, or a Granularity, where the BoxHeader type can be configured for a 3gvo value. Or, the operation of adapting the streamed content can further include storing CVO data for a real-time transport protocol (RTP) stream in a RTP extension header.

In another configuration, the operation of receiving the device capability for the client can further include exchanging a packet switched streaming service (PSS) client capability for the client. The CVO capability can include: a StreamingCVOCapable attribute to indicate whether the client is a CVO capable receiver of real-time transport protocol (RTP) streams, a StreamingHighGranularityCVOCapable attribute to indicate whether the client is a Higher Granularity CVO capable receiver of RTP streams, a ThreeGPCVOCapable attribute to indicate whether the client is a CVO capable receiver of third generation partnership project (3GPP) file format (3GP) files, or a ThreeGPHighGranularityCVOCapable attribute to indicate whether the client is a Higher Granularity CVO capable receiver of 3GP files.

Figure 10:
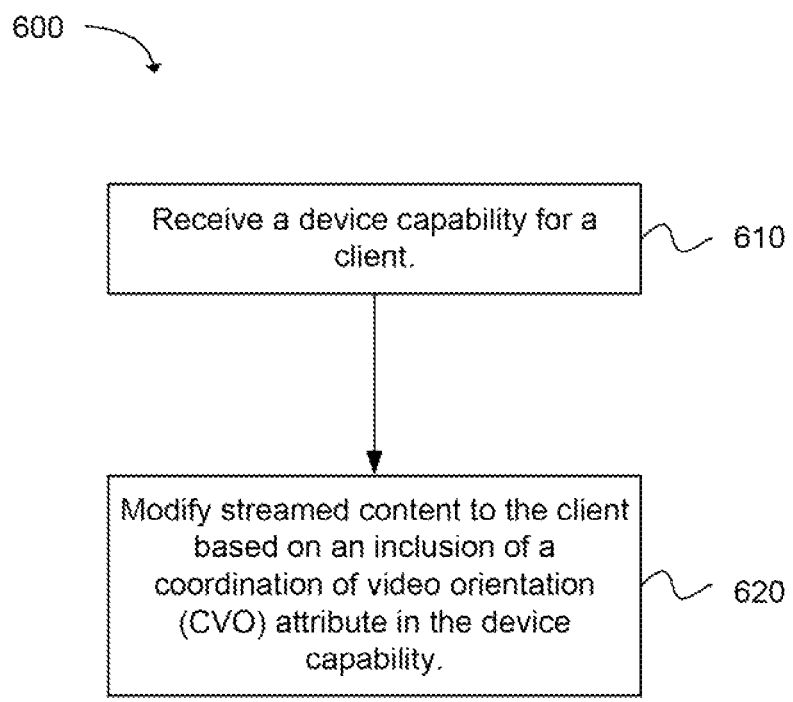
FIG. 10 depicts functionality of computer circuitry of a server operable to provide streaming with coordination of video orientation (CVO) in accordance with an example.

Another example provides functionality 600 of computer circuitry of a server operable to provide streaming with coordination of video orientation (CVO), as shown in the flow chart in FIG. 10. The functionality may be implemented as a method or the functionality may be executed as instructions on a machine, where the instructions are included on at least one computer readable medium or one non-transitory machine readable storage medium. The computer circuitry can be configured to receive a device capability for a client, as in block 610. The computer circuitry can be further configured to modify streamed content to the client based on an inclusion of a CVO attribute in the device capability, as in block 620.

In an example, the computer circuitry configured to modify the streamed content can be further configured to correct a rendering orientation of the a real-time transport protocol (RTP) stream or streamed dynamic adaptive streaming over hypertext transfer protocol (HTTP) (DASH) content for misalignment prior to delivery to the client when the device capability for the client does not include the CVO attribute indicating that the client is not an orientation-aware terminal.

In another example, the computer circuitry configured to modify the streamed content can be further configured to deliver a media presentation description (MPD) metadata file for a streamed dynamic adaptive streaming over hypertext transfer protocol (HTTP) (DASH) content to the client with a CVO indication attribute provided in a codecs common attribute or element for an AdaptationSet, Representation, or SubRepresentation, wherein the codecs attribute is set to '3gvo' indicating a presence of an oriented video component and associated CVO information in the streamed DASH content. Or, the computer circuitry configured to modify the streamed content can be further configured to deliver a session description protocol (SDP) file for a real-time transport protocol (RTP) stream to the client with a CVO indication via an a=extmap attribute with a CVO uniform resource name (URN) "urn:3gpp:video-orientation" representing a 2-bit granularity for a CVO or "urn:3gpp:video-orientation:6" representing a 6-bit granularity for a Higher Granularity CVO on the CVO information contained in a RTP extension header.

In another configuration, the computer circuitry can be further configured to store CVO data in a third generation partnership project (3GPP) file format (3GP) file using a CVOSampleEntry for a CVO timed metadata track in a sample description box of International Organization for Standardization (ISO) file format box structure. The CVOSampleEntry fields can include a BoxHeader size or type, a Data-reference-index, or a Granularity, where the BoxHeader type can be configured for a '3gvo' value. Or, the computer circuitry can be further configured to store CVO data for a real-time transport protocol (RTP) stream in a RTP extension header.

In another example, the computer circuitry configured to receive the device capability can be further configured to exchange a packet switched streaming service (PSS) capability. The CVO attribute can include: a StreamingCVOCapable attribute to indicate whether the client is a CVO capable receiver of real-time transport protocol (RTP) streams, a StreamingHighGranularityCVOCapable attribute to indicate whether the client is a Higher Granularity CVO capable receiver of the RTP streams, a ThreeGPCVOCapable attribute to indicate whether the client is a CVO capable receiver of third generation partnership project (3GPP) file format (3GP) files, or a ThreeGPHighGranularityCVOCapable attribute to indicate whether the client is a Higher Granularity CVO capable receiver of the 3GP files.

In another configuration, the computer circuitry configured to modify the streamed content can be further configured to perform orientation-aware content adaptation, orientation-aware content selection, orientation-aware transcoding, or orientation-aware format conversion to correct a video orientation misalignment and ensure a content playback at the client with a correct video orientation. The server can include a third generation partnership project (3GPP) long term evolution (LTE) packet switched streaming service (PSS) server, a dynamic adaptive streaming over hypertext transfer protocol (HTTP) (DASH) server, or an integrated multimedia subsystem (IMS) based PSS and multimedia broadcast and multicast service (MBMS) (IMS_PSS_MBMS) server.

Figure 11:
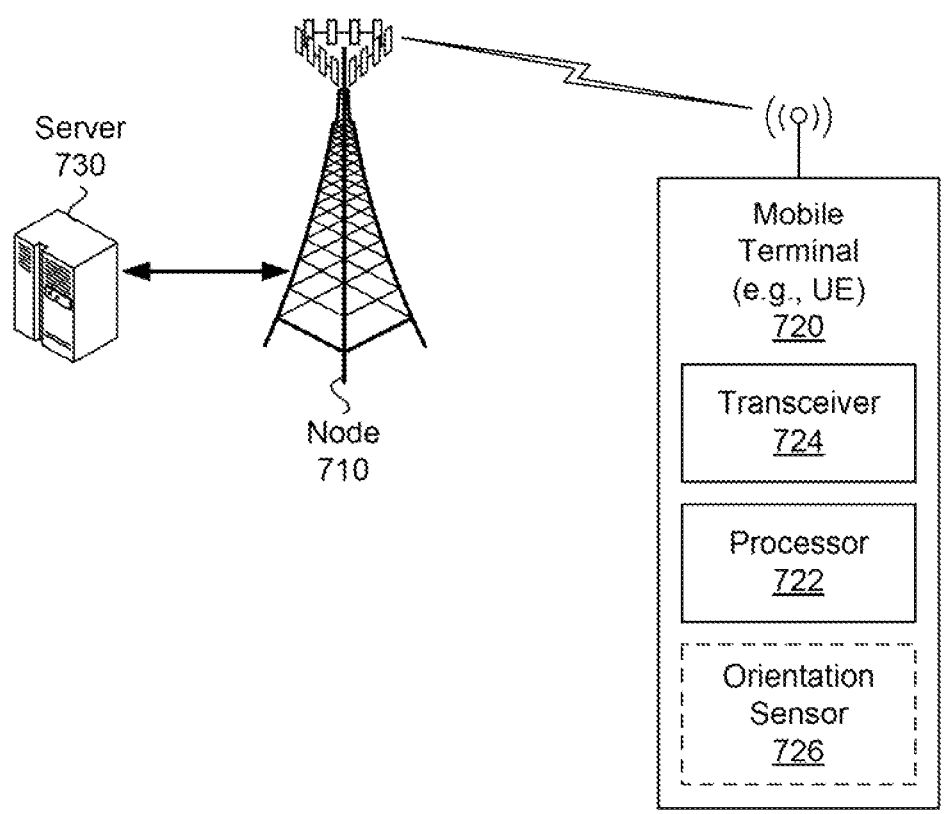
FIG. 11 illustrates a diagram of a server, a node, and a user equipment (UE) in accordance with an example.

FIG. 11 illustrates an example mobile terminal (MT) (e.g., UE or client device) for providing coordination of video orientation (CVO) capability 720, a node 710, and a server 730. The MT can be configured for wireless communication with the node. The server can be configured for signaling coordination of video orientation (CVO) capability of a mobile terminal (MT), as described in 500 of FIG. 9. In another configuration, the server can be operable to provide streaming with coordination of video orientation (CVO), as described in 600 of FIG. 10. The node 710 can include a base station (BS), a Node B (NB), an evolved Node B (eNB), a baseband unit (BBU), a remote radio head (RRH), a remote radio equipment (RRE), a remote radio unit (RRU), or a central processing module (CPM).

Referring back to FIG. 11, the mobile terminal 720 can include a processor 722, a transceiver 724, and an orientation sensor 726. The processor can be configured for determining an MT's CVO capability. The transceiver can be configured to transmit the MT's CVO capability in a streaming component attribute to the server.

In an example, the transceiver 724 can be further configured to receive a real-time transport protocol (RTP) extension header for an RTP stream or a third generation partnership project (3GPP) file format (3GP) file for a hypertext transfer protocol (HTTP) stream or dynamic adaptive streaming over HTTP (DASH). The processor 722 can be further configured to: parse a media presentation description (MPD) metadata file for the 3GP file for a CVO indication attribute or parse the 3GP file for embedded CVO information, determine a orientation correction term based on the parsed CVO information and a current orientation of the MT, and correct a rendering orientation of the HTTP stream or DASH for misalignment based on the determined orientation correction term when the MPD metadata file includes the CVO indication attribute and the MT is an orientation-aware terminal Or, the processor can be configured to: parse a session description protocol (SDP) file for the RTP stream for the CVO indication attribute or parse the RTP extension header for the RTP stream for the embedded CVO information, determine a orientation correction term based on the parsed CVO information and current orientation of the client device, and correct a rendering orientation of the RTP stream for misalignment based on the determined orientation correction term when the SDP file includes the CVO indication attribute and the MT is the orientation-aware terminal Correcting the rendering orientation can compensate for rotation or flip of an orientation.

In another example, the transceiver 724 can be further configured to receive a media presentation description (MPD) metadata file from the server for streamed dynamic adaptive streaming over hypertext transfer protocol (HTTP) (DASH) content with a CVO indication attribute provided in a codecs common attribute or element for an AdaptationSet, Representation, or SubRepresentation. The codecs attribute can be set to '3gvo' indicating a presence of an oriented video component and an associated CVO information in the streamed DASH content. The processor 722 can be further configured to: parse the MPD metadata file for the CVO indication attribute; and modify a rendering orientation of a HTTP stream or the streamed DASH content for misalignment when the MPD metadata file includes the CVO indication attribute and the MT is an orientation-aware terminal.

In another configuration, the transceiver 724 can be further configured to receive a third generation partnership project (3GPP) file format (3GP) file including a CVOSampleEntry for a CVO timed metadata track in a sample description box of International Organization for Standardization (ISO) file format box structure. The CVOSampleEntry fields can include a BoxHeader size or type, a Data-reference-index, or a Granularity, where the BoxHeader type can be configured for a 3gvo value. The processor 722 can be further configured to: parse the 3GP file for the CVOSampleEntry; and modify a rendering orientation of a hypertext transfer protocol (HTTP) stream or streamed dynamic adaptive streaming over HTTP (DASH) content for misalignment when the 3GP file includes the CVOSampleEntry and the MT is an orientation-aware terminal.

In another example, the transceiver 724 can be further configured to exchange a packet switched streaming service (PSS) client capability with the MT's CVO capability. The MT's CVO capability can include: a StreamingCVOCapable attribute to indicate whether the client is a CVO capable receiver of real-time transport protocol (RTP) streams, a StreamingHighGranularityCVOCapable attribute to indicate whether the client is a Higher Granularity CVO capable receiver of RTP streams, a ThreeGPCVOCapable attribute to indicate whether the client is a CVO capable receiver of third generation partnership project (3GPP) file format (3GP) files, or a ThreeGPHighGranularityCVOCapable attribute to indicate whether the client is a Higher Granularity CVO capable receiver of 3GP files.

In another configuration, the processor 722 can be further configured to: capture user-generated content (UGC) video with a specified orientation; and embed CVO information for the UGC video in a third generation partnership project (3GPP) file format (3GP) file. The transceiver 724 can be further configured to upload a 3GP file for a hypertext transfer protocol (HTTP) stream or dynamic adaptive streaming over HTTP (DASH).

In another example, the processor 722 can be further configured to: capture CVO data with a specified orientation; and store the CVO data in a third generation partnership project (3GPP) file format (3GP) file using CVOSampleEntry for a CVO timed metadata track in a sample description box of International Organization for Standardization (ISO) file format box structure. The CVOSampleEntry fields can include a BoxHeader size or type, a Data-reference-index, or a Granularity, where the BoxHeader type can be configured for a 3gvo value. The transceiver 724 can be further configured to upload a 3GP file for a hypertext transfer protocol (HTTP) stream or dynamic adaptive streaming over HTTP (DASH).

In another configuration, the MT's CVO capability can be provided in a third generation partnership project (3GPP) long term evolution (LTE) packet switched streaming service (PSS) session, a dynamic adaptive streaming over hypertext transfer protocol (HTTP) (DASH) session, or an integrated multimedia subsystem (IMS) based PSS and multimedia broadcast and multicast service (MBMS) (IMS_PSS_MBMS) session. The mobile terminal can include the orientation sensor 726 to determine an orientation of the MT.

Figure 12:
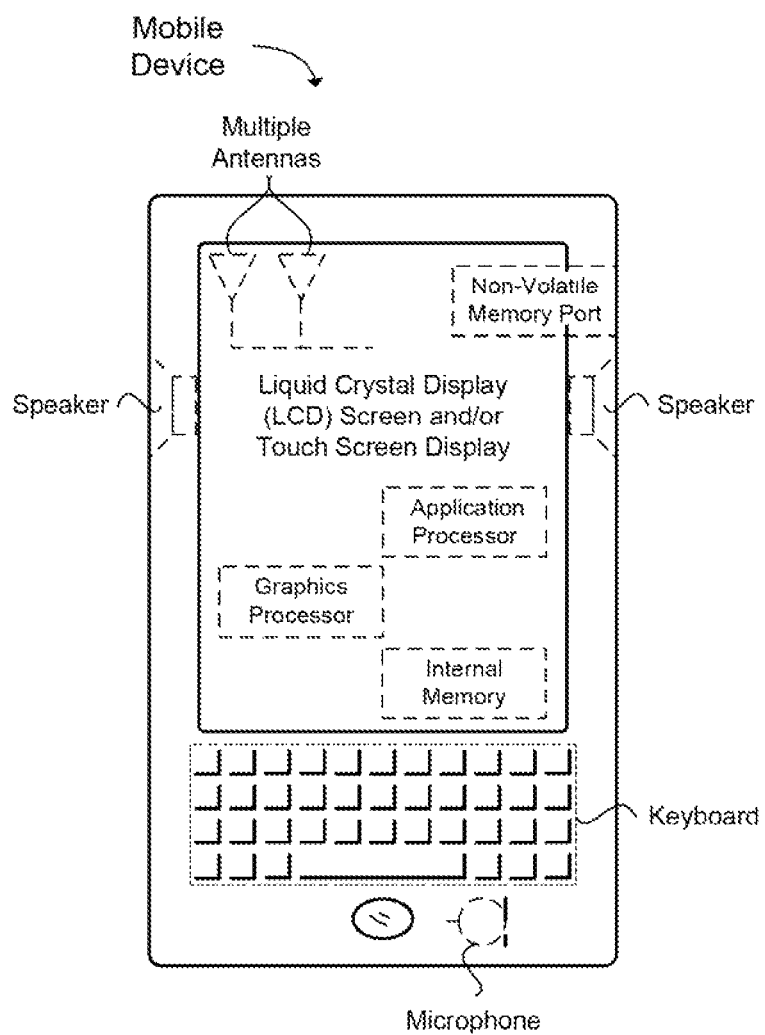
FIG. 12 illustrates a diagram of a wireless device (e.g., UE) in accordance with an example.

FIG. 12 provides an example illustration of the mobile terminal (MT), such as a client device, a mobile node, a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A server operable to provide streaming with coordination of video orientation (CVO), having computer circuitry configured to:
receive a device capability exchange message with a CVO attribute for a client; and
modify content at the server to be streamed to the client based on the CVO attribute received in the device capability,
wherein a session description protocol (SDP) file for a real-time transport protocol (RTP) stream is delivered to the client with a CVO indication via an attribute with a CVO uniform resource name (URN) that represents a 2-bit granularity for a CVO or a 6-bit granularity for a Higher Granularity CVO on CVO information contained in an RTP extension header.

2. The computer circuitry of claim 1, wherein the computer circuitry configured to modify the streamed content is further configured to:
correct a rendering orientation of a real-time transport protocol (RTP) stream or streamed dynamic adaptive streaming over hypertext transfer protocol (HTTP) (DASH) content for misalignment prior to delivery to the client when the device capability for the client does not include the CVO attribute indicating that the client is not an orientation-aware terminal.

3. The computer circuitry of claim 1, wherein the computer circuitry configured to modify the streamed content is further configured to:
deliver a media presentation description (MPD) metadata file for a streamed dynamic adaptive streaming over hypertext transfer protocol (HTTP) (DASH) content from the server to the client with the CVO indication attribute provided in a codec's common attribute or element for an AdaptationSet, Representation, or SubRepresentation, wherein the codec's common attribute is set to '3gvo' indicating a presence of an oriented video component and associated CVO information in the streamed DASH content; and
deliver the SDP file for the RTP stream to the client with the CVO indication attribute via an a=extmap attribute with a CVO uniform resource name (URN) "urn:3gpp:video-orientation" representing the 2-bit granularity for the CVO or a CVO URN "urn:3gpp:video-orientation:6" representing the 6-bit granularity for the Higher Granularity CVO on the CVO information contained in the RTP extension header.

4. The computer circuitry of claim 1, wherein the computer circuitry is configured to:
store CVO data in a third generation partnership project (3GPP) file format (3GP) file using a CVOSampleEntry for a CVO timed metadata track in a sample description box of International Organization for Standardization (ISO) file format box structure, wherein CVOSampleEntry fields include a BoxHeader size or type, a Data-reference-index, or a Granularity, and wherein the BoxHeader type is configured for a '3gvo' value; or
store CVO data for a real-time transport protocol (RTP) stream in an RTP extension header.

5. The computer circuitry of claim 1, wherein the computer circuitry configured to receive the device capability is further configured to:
exchange a packet switched streaming service (PSS) capability, wherein the CVO attribute includes:
a StreamingCVOCapable attribute to indicate whether the client is a CVO capable receiver of real-time transport protocol (RTP) streams,
a StreamingHighGranularityCVOCapable attribute to indicate whether the client is a Higher Granularity CVO capable receiver of the RTP streams,
a ThreeGPCVOCapable attribute to indicate whether the client is a CVO capable receiver of third generation partnership project (3GPP) file format (3GP) files, or
a ThreeGPHighGranularityCVOCapable attribute to indicate whether the client is a Higher Granularity CVO capable receiver of the 3GP files.

6. The computer circuitry of claim 1, wherein the computer circuitry configured to modify the streamed content is further configured to:
perform orientation-aware content adaptation, orientation-aware content selection, orientation-aware transcoding, or orientation-aware format conversion to correct a video orientation misalignment and ensure a content playback at the client with a correct video orientation.

7. The computer circuitry of claim 1, wherein the server includes a third generation partnership project (3GPP) long term evolution (LTE) packet switched streaming service (PSS) server, a dynamic adaptive streaming over hypertext transfer protocol (HTTP) (DASH) server, or an integrated multimedia subsystem (IMS) based PSS and multimedia broadcast and multicast service (MBMS) (IMS_PSS_MBMS) server.

8. A mobile terminal (MT) for providing coordination of video orientation (CVO) capability, comprising:
a processor for determining an MT's CVO capability; and
a transceiver to:
transmit a device capability exchange message that includes the MT's CVO capability in a streaming component attribute to a server; and
receive, from the server, a session description protocol (SDP) file for a real-time transport protocol (RTP) stream with a CVO indication attribute via an attribute with a CVO uniform resource name (URN) that represents a 2-bit granularity for a CVO or a 6-bit granularity for a Higher Granularity CVO on the CVO information contained in an RTP extension header.

9. The mobile terminal of claim 8, wherein:
the transceiver is further configured to:
receive a real-time transport protocol (RTP) extension header for an RTP stream or a third generation partnership project (3GPP) file format (3GP) file for a hypertext transfer protocol (HTTP) stream or dynamic adaptive streaming over HTTP (DASH); and
the processor is further configured to:
parse a media presentation description (MPD) metadata file for the 3GP file for the CVO indication attribute or parse the 3GP file for embedded CVO information,
determine a orientation correction term based on the parsed CVO information and a current orientation of the MT, and
correct a rendering orientation of the HTTP stream or DASH for misalignment based on the determined orientation correction term when the MPD metadata file includes the CVO indication attribute and the MT is an orientation-aware terminal; or
parse the SDP file for the RTP stream for the CVO indication attribute or parse the RTP extension header for the RTP stream for the embedded CVO information,
determine a orientation correction term based on the parsed CVO information and current orientation of the client device, and
correct a rendering orientation of the RTP stream for misalignment based on the determined orientation correction term when the SDP file includes the CVO indication attribute and the MT is the orientation-aware terminal,
wherein correcting the rendering orientation compensates for rotation or flip of an orientation.

10. The mobile terminal of claim 8, wherein:
the transceiver is further configured to:
receive a media presentation description (MPD) metadata file from the server for streamed dynamic adaptive streaming over hypertext transfer protocol (HTTP) (DASH) content with the CVO indication attribute provided in a codec's common attribute or element for an AdaptationSet, Representation, or SubRepresentation, wherein the codec's common attribute is set to '3gvo' indicating a presence of an oriented video component and an associated CVO information in the streamed DASH content; and
the processor is further configured to:
parse the MPD metadata file for the CVO indication attribute; and
modify a rendering orientation of a HTTP stream or the streamed DASH content for misalignment when the MPD metadata file includes the CVO indication attribute and the MT is an orientation-aware terminal.

11. The mobile terminal of claim 8, wherein:
the transceiver is further configured to:
receive a third generation partnership project (3GPP) file format (3GP) file including a CVOSampleEntry for a CVO timed metadata track in a sample description box of International Organization for Standardization (ISO) file format box structure, wherein CVOSampleEntry fields include a BoxHeader size or type, a Data-reference-index, or a Granularity, and wherein the BoxHeader type is configured for a 3gvo value; and
the processor is further configured to:
parse the 3GP file for the CVOSampleEntry; and
modify a rendering orientation of a hypertext transfer protocol (HTTP) stream or streamed dynamic adaptive streaming over HTTP (DASH) content for misalignment when the 3GP file includes the CVOSampleEntry and the MT is an orientation-aware terminal.

12. The mobile terminal of claim 8, wherein:
the transceiver is further configured to:
exchange a packet switched streaming service (PSS) client capability with the MT's CVO capability, wherein the MT's CVO capability includes:
a StreamingCVOCapable attribute to indicate whether the client is a CVO capable receiver of real-time transport protocol (RTP) streams,
a StreamingHighGranularityCVOCapable attribute to indicate whether the client is a Higher Granularity CVO capable receiver of RTP streams,
a ThreeGPCVOCapable attribute to indicate whether the client is a CVO capable receiver of third generation partnership project (3GPP) file format (3GP) files, or
a ThreeGPHighGranularityCVOCapable attribute to indicate whether the client is a Higher Granularity CVO capable receiver of 3GP files.

13. The mobile terminal of claim 8, wherein:
the processor is further configured to:
capture user-generated content (UGC) video with a specified orientation; and
embed CVO information for the UGC video in a third generation partnership project (3GPP) file format (3GP) file; and
the transceiver is further configured to:
upload a 3GP file for a hypertext transfer protocol (HTTP) stream or dynamic adaptive streaming over HTTP (DASH).

14. The mobile terminal of claim 8, wherein:
the processor is further configured to:
capture CVO data with a specified orientation; and
store the CVO data in a third generation partnership project (3GPP) file format (3GP) file using CVOSampleEntry for a CVO timed metadata track in a sample description box of International Organization for Standardization (ISO) file format box structure, wherein CVOSampleEntry fields include a BoxHeader size or type, a Data-reference-index, or a Granularity, and wherein the BoxHeader type is configured for a 3gvo value; and the transceiver is further configured to:
upload a 3GP file for a hypertext transfer protocol (HTTP) stream or dynamic adaptive streaming over HTTP (DASH).

15. The mobile terminal of claim 8, wherein the MT's CVO capability is provided in a third generation partnership project (3GPP) long term evolution (LTE) packet switched streaming service (PSS) session, a dynamic adaptive streaming over hypertext transfer protocol (HTTP) (DASH) session, or an integrated multimedia subsystem (IMS) based PSS and multimedia broadcast and multicast service (MBMS) (IMS_PSS_MBMS) session.

16. The mobile terminal of claim 8, further comprising:
an orientation sensor to determine an orientation of the MT.

17. The mobile terminal of claim 8, wherein the mobile terminal includes a user equipment (UE) or a mobile station (MS), and the mobile terminal includes an antenna, a camera, a touch sensitive display screen, a speaker, a microphone, a graphics processor, an application processor, internal memory, or a non-volatile memory port.

18. A method for signaling coordination of video orientation (CVO) capability of a mobile terminal (MT) at a server, comprising:
receiving a device capability for a client at the server via a device capability exchange message;
identifying when the device capability includes a CVO indication attribute; and
adapting streamed content to the client based on an inclusion of the CVO attribute, wherein a session description protocol (SDP) file for a real-time transport protocol (RTP) stream is delivered to the client with the CVO indication attribute via an attribute with a CVO uniform resource name (URN) that represents a 2-bit granularity for a CVO or a 6-bit granularity for a Higher Granularity CVO on the CVO information contained in an RTP extension header.

19. The method of claim 18, wherein adapting the streamed content further comprises:
modifying a display orientation of a hypertext transfer protocol (HTTP) stream, dynamic adaptive streaming over HTTP (DASH), or real-time transport protocol (RTP) stream for misalignment when the device capability for the client does not include the CVO indication attribute indicating that the client is not an orientation-aware terminal; or
embedding the CVO indication attribute in a media presentation description (MPD) metadata file or a session description protocol (SDP) file when the device capability for the client includes the CVO indication attribute indicating that the client is an orientation-aware terminal to modify the display orientation of a stream.

20. The method of claim 18, wherein adapting the streamed content further comprises:
delivering a media presentation description (MPD) metadata file for a streamed dynamic adaptive streaming over hypertext transfer protocol (HTTP) (DASH) content to the client with the CVO indication attribute provided in a codec's common attribute or element for an AdaptationSet, Representation, or SubRepresentation, wherein the codec's common attribute is set to '3gvo' indicating a presence of an oriented video component and associated CVO information in the stream DASH content; and
deliver the SDP file for the RTP stream to the client with the CVO indication attribute via an a=extmap attribute with a CVO uniform resource name (URN) urn:3gpp:video-orientation" representing the 2-bit granularity for the CVO or a CVO URN "urn:3gpp:video-orientation:6" representing the 6-bit granularity for the Higher Granularity CVO on the CVO information contained in the RTP extension header.

21. The method of claim 18, wherein adapting the streamed content further comprises:
receiving user-generated content (UGC) video including embedded CVO information for the UGC video in a third generation partnership project (3GPP) file format (3GP) file, wherein the 3GP file uses:
a CVOSampleEntry for a CVO timed metadata track in a sample description box of International Organization for Standardization (ISO) file format box structure, wherein CVOSampleEntry fields include a BoxHeader size or type, a Data-reference-index, or a Granularity, and wherein the BoxHeader type is configured for a 3gvo value; or
a codec's common attribute or element for an AdaptationSet, Representation, or SubRepresentation of a media presentation description (MPD), wherein the codec's common attribute is set to '3gvo' indicating a presence of an oriented video component and associated CVO information in a streamed dynamic adaptive streaming over hypertext transfer protocol (HTTP) (DASH) content.

22. The method of claim 18, wherein adapting the streamed content further comprises:
storing CVO data in a third generation partnership project (3GPP) file format (3GP) file using a CVOSampleEntry for a CVO timed metadata track in a sample description box of International Organization for Standardization (ISO) file format box structure, wherein CVOSampleEntry fields include a BoxHeader size or type, a Data-reference-index, or a Granularity, and wherein the BoxHeader type is configured for a 3gvo value; or
storing CVO data for a real-time transport protocol (RTP) stream in a RTP extension header.

23. The method of claim 18, wherein receiving the device capability for the client further comprises:
exchanging a packet switched streaming service (PSS) client capability for the client, wherein the CVO capability includes:
a StreamingCVOCapable attribute to indicate whether the client is a CVO capable receiver of real-time transport protocol (RTP) streams,
a StreamingHighGranularityCVOCapable attribute to indicate whether the client is a Higher Granularity CVO capable receiver of RTP streams,
a ThreeGPCVOCapable attribute to indicate whether the client is a CVO capable receiver of third generation partnership project (3GPP) file format (3GP) files, or
a ThreeGPHighGranularityCVOCapable attribute to indicate whether the client is a Higher Granularity CVO capable receiver of 3GP files.

24. At least one non-transitory machine readable storage medium comprising a plurality of instructions adapted to be executed to implement the method of claim 18.

* * * * *